United States Patent
Seidel et al.

(10) Patent No.: US 7,714,066 B2
(45) Date of Patent: May 11, 2010

(54) POLYCARBONATE MOLDING COMPOSITIONS

(75) Inventors: Andreas Seidel, Dormagen (DE); Thomas Eckel, Dormagen (DE); Holger Warth, Hong Kong (CN); Eckhard Wenz, Köln (DE); Bernd Keller, Geldern (DE); Dieter Wittmann, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 358 days.

(21) Appl. No.: 11/405,652

(22) Filed: Apr. 17, 2006

(65) Prior Publication Data

US 2006/0241243 A1   Oct. 26, 2006

(30) Foreign Application Priority Data

Apr. 21, 2005   (DE) ................. 10 2005 018 472

(51) Int. Cl.
*C08L 53/00*   (2006.01)
*C08L 53/02*   (2006.01)
*C08L 51/00*   (2006.01)

(52) U.S. Cl. ..................... 525/67; 525/89; 428/412; 524/315

(58) Field of Classification Search ............ 525/67, 525/89, 133, 148; 524/306, 315, 318; 428/412
See application file for complete search history.

(56) References Cited

U.S. PATENT DOCUMENTS

| 3,140,177 | A | 7/1964 | Welch |
| 4,548,987 | A | 10/1985 | Bauer et al. |
| 5,302,664 | A | 4/1994 | Eichenauer et al. |
| 5,900,446 | A | 5/1999 | Nishihara et al. |
| 6,069,206 | A | 5/2000 | Nishihara et al. |
| 6,174,958 | B1 * | 1/2001 | Guntherberg et al. ......... 525/67 |
| 6,365,710 | B1 * | 4/2002 | Wang et al. ................. 528/480 |
| 6,503,628 | B1 * | 1/2003 | Janarthanan et al. ........ 428/412 |
| 2005/0009970 | A1 | 1/2005 | Seidel et al. |

FOREIGN PATENT DOCUMENTS

| CA | 2 507 622 | 6/2004 |
| EP | 0 219 090 A2 | 4/1987 |
| EP | 0 372 336 B1 | 1/1995 |

\* cited by examiner

*Primary Examiner*—James Seidleck
*Assistant Examiner*—Saira Haider
(74) *Attorney, Agent, or Firm*—Baker, Donelson, Bearman, Caldwell & Berkowitz, PC

(57) ABSTRACT

An impact-modified polycarbonate composition is disclosed. The composition features good processing stability, low temperature toughness and chemical resistance to stress cracking. It includes two copolymers of a vinylaromatic compound and a functionalized vinylolefinic compound and is suitable for the production of complex components.

14 Claims, No Drawings

POLYCARBONATE MOLDING COMPOSITIONS

FIELD OF THE INVENTION

The invention relates to thermoplastic molding composition and specifically to impact-modified polycarbonate compositions.

BACKGROUND OF THE INVENTION

Thermoplastic molding compositions of polycarbonates and ABS polymers (acrylonitrile/butadiene/styrene) have been known for a long time. Thus, U.S. Pat. No. 3,130,177 A describes readily processable molding compositions of polycarbonates and graft polymers of monomer mixtures of acrylonitrile and an aromatic vinyl-hydrocarbon on polybutadiene.

EP 0 372 336 A2 discloses PC/ABS compositions (polycarbonate/acrylonitrile/butadiene/styrene) having a high toughness at low temperatures, which are characterized in that the graft polymers and/or the copolymers are replaced at least in part by graft polymers and/or copolymers in which the grafted-on material and/or the copolymer contains at least 86 wt. % of vinylaromatics.

DE 102 55 825 A1 discloses PC/ABS compositions of improved surface quality comprising a mixture, obtained by coprecipitation, of at least one graft polymer B*.1 prepared by emulsion polymerization and at least one thermoplastic vinyl (co)polymer B*.2 prepared by emulsion polymerization, as well as at least one thermoplastic vinyl (co)polymer C*.2 prepared by solution, bulk or suspension polymerization, wherein, in a preferred embodiment, the vinyl (co)polymers B*.2 and C* differ in the acrylonitrile content by 1 to 15 wt. %, preferably by 2 to 10 wt. %, particularly preferably by 2.5 to 7.5 wt. %.

EP 0 767 215 A1 discloses compositions comprising polycarbonate, a rubber-modified (acrylonitrile-free) styrene resin and, as a phase mediator, a copolymer or a graft copolymer. The copolymers or the graft shells of the graft copolymers in the compositions according to the invention of EP 0 767 215 A1 are distinguished in that, at the molecular level, they have a non-uniform distribution in respect of the ratio of amounts of the monomers on which they are based, which results in different individual solubility parameters. In the case of a styrene/acrylonitrile copolymer (SAN), the solubility parameters stated in EP 0 767 215 A1 correspond, from the calculation basis described, to a weight-average acrylonitrile content of from 2 to about 12.5 wt. % and a difference between the minimum and maximum individual molecular acrylonitrile contents of from 8 to 26 wt. %.

The object on which the invention is based comprises providing molding compositions having an improved processing stability for the production of complex moldings for automobile construction, which are distinguished by a combination of a good low temperature toughness over a wide processing window and good resistance to stress cracking under the action of chemicals. The present invention also provides molding compositions which, in addition to the abovementioned requirements, also meet the requirements of the European automobile industry on materials in automobile interior construction in limiting the emission of volatile organic components.

SUMMARY OF THE INVENTION

An impact-modified polycarbonate composition is disclosed. The composition features good processing stability, low temperature toughness and chemical resistance to stress cracking. It includes two copolymers of a vinylaromatic compound and a functionalized vinylolefinic compound and is suitable for the production of complex components.

DETAILED DESCRIPTION OF THE INVENTION

It has been found that impact-modified polycarbonate (and/or polyester) compositions which include two copolymers of a vinylaromatic compound and a functionalized vinylolefinic compound, wherein
a) the copolymers are employed in a certain ratio of amounts with respect to one another and
b) the two copolymers are built up from the same monomers and differ in the ratio of the monomers employed in the manner defined below, have the desired properties.

The present invention therefore provides compositions comprising
A) 30 to 80 parts by wt., preferably 40 to 75 parts by wt., particularly preferably 40 to 60 parts by wt. of aromatic polycarbonate and/or polyester-carbonate,
B) 5 to 60 parts by wt., preferably 10 to 45 parts by wt., particularly preferably 10 to 30 parts by wt. of a graft polymer and
C) 10 to 60 parts by wt., preferably 15 to 40 parts by wt., particularly preferably 20 to 40 parts by wt. of a mixture of
  C.1) 40 to 92 wt. %, preferably 60 to 90 wt. %, particularly preferably 65 to 90 wt. %, based on component C), of a first copolymer prepared by the solution, bulk or suspension process from
    C.1.1) 65 to 75 wt. %, preferably 70 to 74 wt. %, based on component C.1), of at least one monomer selected from the group consisting of vinylaromatics (such as, for example, styrene and α-methylstyrene) and vinylaromatics substituted on the nucleus (such as, for example, p-methylstyrene and p-chlorostyrene) and
    C.1.2) 25 to 35 wt. %, preferably 26 to 30 wt. %, based on component C.1), of at least one monomer selected from the group consisting of vinyl cyanides (such as, for example, unsaturated nitriles, such as acrylonitrile and methacrylonitrile), (meth)acrylic acid ($C_1$-$C_8$)-alkyl esters (such as, for example, methyl methacrylate, n-butyl acrylate and tert-butyl acrylate), unsaturated carboxylic acids and derivatives of unsaturated carboxylic acids (for example maleic anhydride and N-phenyl-maleimide)
  and
  C.2) 8 to 60 wt. %, preferably 10 to 40 wt. %, particularly preferably 10 to 35 wt. %, based on component C), of a second copolymer prepared by the solution, bulk or suspension process from
    C.2.1) 75.1 to 85 wt. %, preferably 76 to 80 wt. %, based on component C.2), of at least one monomer selected from the group consisting of vinylaromatics (such as, for example, styrene and α-methylstyrene) and vinylaromatics substituted on the nucleus (such as, for example, p-methylstyrene and p-chlorostyrene) and
    C.2.2) 15 to 24.9 wt. %, preferably 20 to 24 wt. %, based on component C.2), of at least one monomer selected from the group consisting of vinyl cyanides (such as, for example, unsaturated nitriles, such as acrylonitrile and methacrylonitrile), (meth)acrylic acid ($C_1$-$C_8$)-alkyl esters (such as, for example, methyl methacrylate, n-butyl acrylate and tert-butyl acrylate), unsaturated carboxylic acids and derivatives of unsaturated carboxylic acids (for example maleic anhydride and N-phenyl-maleimide).

In a preferred embodiment, the content of polymerized monomers C.1.2) in copolymer C.1) and the content of polymerized monomers C.2.2) in copolymer C.2) differ from one another by 2 to 10 wt. %, preferably by 2.5 to 7 wt. %, particularly preferably by 3 to 6 wt. %.

The components suitable according to the invention of the impact-modified polycarbonate compositions are explained below by way of examples.

Component A

Aromatic polycarbonates and/or aromatic polyester-carbonates according to component A which are suitable according to the invention are known from the literature or may be prepared by processes known from the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610 and DE-A 3 832 396; for the preparation of aromatic polyester-carbonates e.g. DE-A 3 077 934).

The preparation of aromatic polycarbonates is carried out e.g. by reaction of diphenols with carbonic acid halides, preferably phosgene, and/or with aromatic dicarboxylic acid dihalides, preferably benzenedicarboxylic acid dihalides, by the phase interface process, optionally using chain terminators, for example monophenols, and optionally using branching agents which are trifunctional or of higher functionality, for example triphenols or tetraphenols. A preparation via a melt polymerization process by reaction of diphenols with, for example, diphenyl carbonate is also possible.

Diphenols for the preparation of the aromatic polycarbonates and/or aromatic polyester-carbonates are preferably those of the formula (I)

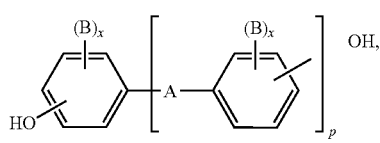

wherein

A is a single bond, $C_1$ to $C_5$-alkylene, $C_2$ to $C_5$-alkylidene, $C_5$ to $C_6$-cycloalkylidene, —O—, —SO—, —CO—, —S—, —SO$_2$—, $C_6$ to $C_{12}$-arylene, on to which further aromatic rings optionally containing heteroatoms may be fused, or a radical of the formula (II) or (III)

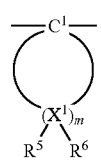

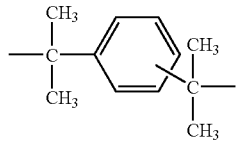

B in each case is $C_1$ to $C_{12}$-alkyl, preferably methyl, or halogen, preferably chlorine and/or bromine, x in each case independently of one another, is 0, 1 or 2, p is 1 or 0 and $R^5$ and $R^6$ are selected individually for each $X^1$ and independently of one another denote hydrogen or $C_1$ to $C_6$-alkyl, preferably hydrogen, methyl or ethyl, $X^1$ denotes carbon and m denotes an integer from 4 to 7, preferably 4 or 5, with the proviso that on at least one atom $X^1$ $R^5$ and $R^6$ are simultaneously alkyl.

Preferred diphenols and dihydroxy and compounds are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl)ethers, bis-(hydroxyphenyl)sulfoxides, bis-(hydroxyphenyl)ketones, bis-(hydroxyphenyl)sulfones and α,α-bis-(hydroxyphenyl)-diisopropylbenzenes and nucleus-brominated and/or nucleus-chlorinated derivatives thereof.

Particularly preferred diphenols are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl sulfone and di- and tetrabrominated or chlorinated derivatives thereof, such as, for example, 2,2-bis-(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane. 2,2-Bis-(4-hydroxyphenyl)-propane (bisphenol A) is particularly preferred.

The diphenolsand dihydroxy compounds may be employed individually or as any desired mixtures. The diphenols are known from the literature or obtainable by processes known from the literature.

Chain terminators which are suitable for the preparation of the thermoplastic, aromatic polycarbonates are, for example, phenol, p-chlorophenol, p-tert-butylphenol or 2,4,6-tribromophenol, and also long-chain alkylphenols, such as 4-(1,3-tetramethylbutyl)-phenol according to DE-A 2 842 005 or monoalkylphenols or dialkylphenols having a total of 8 to 20 carbon atoms in the alkyl substituents, such as 3,5-di-tert-butylphenol, p-iso-octylphenol, p-tert-octylphenol, p-dodecylphenol and 2-(3,5-dimethylheptyl)-phenol and 4-(3,5-dimethylheptyl)-phenol. The amount of chain terminators to be employed is in general between 0.5 mol % and 10 mol %, based on the sum of the moles of the particular diphenols and aromatic dihydroxy compounds employed.

The thermoplastic, aromatic polycarbonates have average weight-average molecular weights ($M_w$, measured e.g. by ultracentrifuge or scattered light measurement) of from 10,000 to 200,000, preferably 15,000 to 50,000, in particular of from 20,000 to 40,000, very particularly preferably of from 24,000 to 32,000.

The thermoplastic, aromatic polycarbonates may be branched in a known manner, and in particular preferably by incorporation of 0.05 to 2.0 mol %, based on the sum of the diphenols employed, of compounds which are trifunctional or of a higher functionality, for example those having three and more phenolic groups.

Both homopolycarbonates and copolycarbonates are suitable. It is also possible for 1 to 25 wt. %, preferably 2.5 to 25 wt. %, based on the total amount of diphenols to be employed, of polydiorganosiloxanes having hydroxyaryloxy end groups to be employed for the preparation of copolycarbonates according to the invention according to component A. These are known (U.S. Pat. No. 3,419,634) and may be prepared by processes known from the literature. The preparation of copolycarbonates containing polydiorganosiloxanes is described in DE-A 3 334 782.

Preferred polycarbonates are, in addition to the bisphenol A-derived homopolycarbonates, the copolycarbonates of bisphenol A with up to 15 mol %, based on the sum of the moles of diphenols, of other diphenols mentioned as preferred or particularly preferred, in particular 2,2-bis-(3,5-dibromo-4-hydroxyphenyl)-propane.

Aromatic dicarboxylic acid dihalides for the preparation of aromatic polyester-carbonates are preferably the diacid dichlorides of isophthalic acid, terephthalic acid, diphenyl ether-4,4'-dicarboxylic acid and of naphthalene-2,6-dicarboxylic acid.

Mixtures of the diacid dichlorides of isophthalic acid and of terephthalic acid in a ratio of between 1:20 and 20:1 are particularly preferred.

A carbonic acid halide, preferably phosgene, is additionally co-used as a bifunctional acid derivative in the preparation of polyester-carbonates.

Possible chain terminators for the preparation of the aromatic polyester-carbonates are, in addition to the monophenols already mentioned, also chlorocarbonic acid esters thereof as well as the acid chlorides of aromatic monocarboxylic acids, which may optionally be substituted by $C_1$- to $C_{22}$-alkyl groups or by halogen atoms, as well as aliphatic $C_2$ to $C_{22}$-monocarboxylic acid chlorides.

The amount of chain terminators is in each case 0.1 to 10 mol %, based on the moles of diphenol in the case of the phenolic chain terminators and on the moles of dicarboxylic acid dichloride in the case of monocarboxylic acid chloride chain terminators.

The aromatic copolyester-carbonates may also contain incorporated aromatic hydroxycarboxylic acids.

The aromatic polyester-carbonates may be either linear or branched in a known manner (in this context see DE-A 2 940 024 and DE-A 3 007 934).

Branching agents which may be used are, for example, carboxylic acid chlorides which are trifunctional or more than trifunctional, such as trimesic acid trichloride, cyanuric acid trichloride, 3,3',4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol % (based on the dicarboxylic acid dichlorides employed), or phenols which are trifunctional or more than trifunctional, such as phloroglucinol, 4,6-dimethyl-2,4,6-tri-(4-hydroxyphenyl)-hept-2-ene, 4,4-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, tetra-(4-hydroxyphenyl)-methane, 2,6-bis-(2-hydroxy-5-methyl-benzyl)-4-methyl-phenol, 2-(4-hydroxyphenyl)-2-(2,4-dihydroxyphenyl)-propane, tetra-(4-[4-hydroxyphenyl-isopropyl]-phenoxy)-methane and 1,4-bis-[4,4'-dihydroxytriphenyl)-methyl]-benzene, in amounts of from 0.01 to 1.0 mol %, based on the diphenols employed. Phenolic branching agents may be initially introduced into the reaction vessel with the diphenols, and acid chloride branching agents may be introduced together with the acid dichlorides.

The content of carbonate structural units in the thermoplastic, aromatic polyester-carbonates may be varied as desired. Preferably, the content of carbonate groups is up to 100 mol %, in particular up to 80 mol %, particularly preferably up to 50 mol %, based on the sum of ester groups and carbonate groups. Both the ester and the carbonate content of the aromatic polyester-carbonates may be present in the polycondensate in the form of blocks or in random distribution.

The relative solution viscosity ($\eta_{rel}$) of the aromatic polycarbonates and polyester-carbonates is in the range of 1.18 to 1.4, preferably 1.20 to 1.32 (measured on solutions of 0.5 g polycarbonate or polyester-carbonate in 100 ml methylene chloride solution at 25° C.).

The thermoplastic, aromatic polycarbonates and polyester-carbonates may be employed by themselves or in any desired mixture.

Component B

Component B comprises graft polymers of

B.1) 5 to 95 wt. %, preferably 30 to 90 wt. %, based on B), of a mixture of

B.1.1) 65 to 85 wt. %, preferably 70 to 80 wt. %, based on B.1, of at least one monomer selected from the group consisting of vinylaromatics (such as, for example, styrene and α-methylstyrene), vinylaromatics substituted on the nucleus (such as, for example, p-methylstyrene and p-chlorostyrene) and methacrylic acid ($C_1$-$C_8$)-alkyl esters (such as, for example, methyl methacrylate and ethyl methacrylate) and B.1.2) 15 to 35 wt. %, preferably 20 to 30 wt. %, based on B.1, of at least one monomer selected from the group consisting of vinyl cyanides (such as, for example, unsaturated nitriles, such as acrylonitrile and methacrylonitrile), (meth)acrylic acid ($C_1$-$C_8$)-alkyl esters (such as, for example, methyl methacrylate, n-butyl acrylate and tert-butyl acrylate) and derivatives (such as, for example, anhydrides and imides) of unsaturated carboxylic acids (for example maleic anhydride and N-phenyl-maleimide)

on

B.2) 95 to 5 wt. %, preferably 70 to 10 wt. %, of at least one graft base having a glass transition temperature of <0° C., preferably <−20° C. The graft base B.2 in general has a median particle size ($d_{50}$ value) of from 0.05 to 10 μm, preferably 0.1 to 5 μm, particularly preferably 0.2 to 1 μm.

Preferred monomers B.1.1 are selected from at least one of the monomers styrene, α-methylstyrene and methyl methacrylate, and preferred monomers B.1.2 are selected from at least one of the monomers acrylonitrile, maleic anhydride and methyl methacrylate.

Particularly preferred monomers are B.1.1 styrene and B.1.2 acrylonitrile.

Graft bases B.2 which are suitable for the graft polymers B are, for example, diene rubbers, EP(D)M rubbers, that is to say those based on ethylene/propylene and optionally diene, acrylate, polyurethane, silicone, chloroprene and ethylene/vinyl acetate rubbers and mixtures of such rubbers or silicone/acrylate composite rubbers in which the silicone and the acrylate components are linked chemically to one another (e.g. by grafting).

Preferred graft bases B.2 are diene rubbers (e.g. based on butadiene or isoprene) or mixtures of diene rubbers or copolymers of diene rubbers or mixtures thereof with further copolymerizable monomers (e.g. according to B.1.1 and B.1.2). Pure polybutadiene rubber is particularly preferred.

Particularly preferred polymers B are e.g. ABS polymers (emulsion, bulk and suspension ABS), such as are described e.g. in DE-A 2 035 390 (=U.S. Pat. No. 3,644,574) or in DE-A 2 248 242 (=GB 1 409 275) and in Ullmanns, Enzyklopädie der Technischen Chemie, vol. 19 (1980), p. 280 et seq. The gel content of the graft base B.2 is at least 30 wt. %, preferably at least 40 wt. % (measured in toluene).

The graft copolymers B are prepared by free-radical polymerization, e.g. by emulsion, suspension, solution or bulk polymerization, preferably by emulsion or bulk polymerization.

Particularly suitable graft rubbers are ABS polymers which are prepared by redox initiation with an initiator system of organic hydroperoxide and ascorbic acid in accordance with U.S. Pat. No. 4,937,285.

Suitable acrylate rubbers according to B.2 of the polymers B are, preferably, polymers of acrylic acid alkyl esters, optionally with up to 40 wt. %, based on B.2, of other polymerizable, ethylenically unsaturated monomers. The preferred polymerizable acrylic acid esters include $C_1$ to $C_8$-alkyl esters, for example methyl, ethyl, butyl, n-octyl and 2-ethylhexyl esters; halogenoalkyl esters, preferably halogeno-$C_1$-$C_8$-alkyl esters, such as chloroethyl acrylate, and mixtures of these monomers.

For crosslinking, monomers having more than one polymerizable double bond may be copolymerized. Preferred examples of crosslinking monomers are esters of unsaturated monocarboxylic acids having 3 to 8 C atoms and unsaturated monohydric alcohols having 3 to 12 C atoms, or saturated polyols having 2 to 4 OH groups and 2 to 20 C atoms, such as ethylene glycol dimethacrylate and allyl methacrylate; polyunsaturated heterocyclic compounds, such as trivinyl and triallyl cyanurate; and polyfunctional vinyl compounds, such as di- and trivinylbenzenes, and also triallyl phosphate and diallyl phthalate.

Preferred crosslinking monomers are allyl methacrylate, ethylene glycol dimethacrylate, diallyl phthalate and heterocyclic compounds which have at least three ethylenically unsaturated groups.

Particularly preferred crosslinking monomers are the cyclic monomers triallyl cyanurate, triallyl isocyanurate, triacryloylhexahydro-s-triazine and triallylbenzenes. The amount of the crosslinking monomers is preferably 0.02 to 5, in particular 0.05 to 2 wt. %, based on the graft base B.2.

In the case of cyclic crosslinking monomers having at least three ethylenically unsaturated groups, it is advantageous to limit the amount to less than 1 wt. % of the graft base B.2.

Preferred "other" polymerizable, ethylenically unsaturated monomers which may optionally serve for the preparation of the graft base B.2 in addition to the acrylic acid esters are e.g. acrylonitrile, styrene, α-methylstyrene, acrylamides, vinyl $C_1$-$C_6$-alkyl ethers, methyl methacrylate and butadiene. Preferred acrylate rubbers as the graft base B.2 are emulsion polymers which have a gel content of at least 60 wt. %.

Further suitable graft bases according to B.2 are silicone rubbers having grafting-active sites, such as are described in DE-A 3 704 657, DE-A 3 704 655. DE-A 3 631 540 and DE-A 3 631 539 corresponding to U.S. Pat. Nos. 4,859,740, 4,861,831, 4,806,593 and 4,812,515 all incorporated herein by reference The gel content of the graft base B.2 is determined at 25° C. in a suitable solvent (M. Hoffmann, H. Krömer, R. Kuhn, Polymeranalytik I und II, Georg Thieme-Verlag, Stuttgart 1977).

The median particle size ($d_{50}$) is the diameter above and below which in each case 50 wt. % of the particles lie. It may be determined by means of ultracentrifuge measurement (W. Scholtan, H. Lange, Kolloid, Z. und Z. Polymere 250 (1972), 782-1796).

Component C

Component C is a mixture of two thermoplastic copolymers which have been prepared by the solution, bulk or suspension polymerization process. The copolymers are resinous, thermoplastic and rubber-free. The copolymers preferably have weight average molecular weights $M_w$ (weight-average, determined by GPC, light scattering or sedimentation) of between 15,000 and 300,000, preferably between 60,000 and 250,000, in particular between 80,000 and 200,000. The relative amounts of these copolymers and their constituents have been described above.

Very particularly preferably, components C.1.1 and C.2.1 are styrene and components C.1.2 and C.2.2 are acrylonitrile.

Component D

The composition may further contain polymer additives known for their function in the context of polycarbonate molding compositions, such as, for example, flameproofing agents (e.g. organophosphates, silicones or halogenated organic compounds), antidripping agents (for example compounds of the substance classes of fluorinated polyolefins, silicones and aramid fibers), lubricants and mold release agents (for example pentaerythritol tetrastearate), nucleating agents, antistatics, stabilizers, fillers and reinforcing substances (for example glass fibers or carbon fibers, mica, talc, wollastonite, kaolin, $CaCO_3$ and glass flakes) as well as dyestuffs and pigments. These additives are employed in the molding compositions according to the invention in concentrations of up to 20 wt. %, preferably of up to 10 wt. %, in particular of up to 5 wt. %, based on the composition.

All the parts by weight data in this Application are standardized such that the sum of the parts by weight of components A) to C) and optionally D) in the composition is 100.

The molding compositions according to the invention are prepared by a procedure in which the particular constituents are mixed in a known manner and the mixture is subjected to melt compounding and melt extrusion at temperatures of from 200° C. to 300° C. in conventional units, such as internal kneaders, extruders and twin-screw extruders. In a preferred embodiment, a vacuum is applied during the compounding for the purpose of devolatilization of volatile constituents (such as e.g. residual monomers and residual solvent).

The mixing of the individual constituents may be carried out in a known manner both successively and simultaneously, and in particular both at about 20° C. (room temperature) and at a higher temperature.

In a preferred embodiment, in the preparation of the molding compositions according to the invention component B or a part amount of component B is mixed with component C or a part amount of component C or only with one of the copolymers C.1 or C.2 or with a part amount of the copolymers C.1 or C.2 in a first step to give a precompound. In a particularly preferred embodiment, a low-emission precompound is prepared from a graft polymer B and at least one of the components C.1 and C.2 by compounding with vacuum devolatilization in the first step. It is particularly advantageous to employ component B in this devolatilizing compounding in the moist state (i.e. in the presence of water) in accordance with the process which is described in EP 0 768 157 A1 and EP 0 867 463 A1. Precompounds in which the total content of volatile organic compounds is less than 400 mg/kg, preferably less than 300 mg/kg, in particular less than 200 mg/kg, are particularly suitable. In a subsequent process step, the other constituents and the precompound are mixed in a known manner and the mixture is subjected to melt compounding or melt extrusion at temperatures of from 200° C. to 300° C. in conventional units, such as internal kneaders, extruders and twin-screw extruders. In a preferred embodiment, a reduced pressure of <500 mbar, preferably <150 mbar, in particular <100 mbar is applied during this second compounding step for the purpose of further devolatilization of volatile constituents (such as e.g. residual monomers and residual solvent). Molding compositions which meet the requirements of the automobile industry on materials in automobile interiors in respect of limiting the emission of volatile organic constituents may be prepared by this process. PC/ABS compositions which have, in accordance with the automobile standard VDA 277, an emission value of less than 30 μg carbon equivalent/g material, preferably less than 20 μg carbon equivalent/g material and particularly preferably less than 15 μg carbon equivalent/g material may be prepared in this manner.

The present invention therefore also provides a process for the preparation of low-emission compositions according to the invention.

The molding compositions according to the invention may be used for the production of all types of shaped articles. These may be produced by injection molding, extrusion and the blow molding process. A further form of processing is the production of shaped articles by thermoforming from previously produced sheets or films. Examples of such shaped articles are films, profiles, components in the automobile sector, all types of housing parts, e.g. for domestic appliances, such as juice presses, coffee machines and mixers; for office machines, such as monitors, flat screens, notebooks, printers and copiers; sheets, pipes, electrical installation conduits, windows doors and further profiles for the building sector (interior finishing and exterior uses) and electrical and electronic parts, such as switches, plugs and plug sockets.

The molding compositions according to the invention may also be used, for example, for the production of the following shaped articles or moldings: interior finishing parts for rail vehicles, ships, aircraft, buses and other motor vehicles, housings of electrical equipment containing small transformers, housings for equipment for information processing and transmission, housings and cladding for medical equipment, massage equipment and housings therefor, toy vehicles for children, planar wall elements, housings for safety equipment, thermally insulated transportation containers, moldings for sanitary and bath fittings, cover gratings for ventilator openings and housings for garden equipment.

The compositions are suitable in particular for the production of thin-walled safety-related parts for automobile interior construction, particularly preferably for those parts where increased demands are made on the mechanical properties and the resistance to chemicals.

The present invention therefore also provides a process for the preparation of the compositions and the use thereof for the production of moldings and the moldings themselves.

The following examples serve to illustrate the invention further.

EXAMPLES

Component A

Linear polycarbonate based on bisphenol A having a weight-average molecular weight $M_w$ of 26 kg/mol (determined by GPC).

Component B

Graft polymer of 40 parts by weight of a copolymer of styrene and acrylonitrile in the weight ratio of 72:28 on 60 parts by weight of particulate crosslinked polybutadiene rubber (average particle diameter $d_{50}=0.3$ μm), prepared by emulsion polymerization. The graft polymer has a gel content of 85 wt. %.

Component C1

Copolymer of 72 parts by weight of styrene and 28 parts by weight of acrylonitrile having a weight-average molecular weight $\overline{M}_w$ of 100 kg/mol (determined by GPC), prepared by the bulk process.

Component C2

Copolymer of 77 wt. % styrene and 23 wt. % acrylonitrile having a weight-average molecular weight $\overline{M}_w$ of 130 kg/mol (determined by GPC), prepared by the bulk process.

Component D

Additives: D1: Pentaerythritol tetrastearate
D2: Phosphite stabilizer

Precompound of B and C1

For the preparation of a low-emission precompound, 50 parts by wt. of component B and 50 parts by wt. of component C1 (in each case based on 100 parts by wt. of precompound) are compounded under vacuum devolatilization. The procedure corresponds to the process of devolatilizing compounding described in EP 0 768 157 A1 and EP 0 867 463 A1 (corresponding to U.S. Pat. Nos. 5,786,445 and 6,153,692 both incorporated herein by reference). The resulting precompound has a total content of volatile organic compounds of less than 300 ppm.

Preparation and Testing of the Molding Compositions According to the Invention

Mixing of the components was carried out on a twin-screw extruder (ZSK25 from Werner und Pfleiderer) at a melt temperature of 260° C. and under a vacuum of 80 mbar. The shaped articles were produced (unless described otherwise) on an injection molding machine of the type Arburg 270 E at a melt temperature of 260° C. and a mold temperature of 80° C.

The multiaxial penetration test was carried out in accordance with ISO 6603-2 at −30° C. on square sheets of dimensions 8 cm×8 cm×2 mm. 10 sheets are tested per setting. The properties evaluated were a) the fracture pattern and b) the average total energy uptake. The material is deemed brittle if splintering, i.e. brittle failure occurred on more than one of the 10 sheets.

The impact strength was evaluated as the IZOD notched impact strength according to ISO 180/1A at −30° C., which is determined on test specimens of dimensions 80 mm×10 mm×4 mm, the test specimens being produced at an elevated melt temperature of 300° C. under otherwise unchanged injection molding parameters.

The stress cracking resistance (ESC properties) was investigated on bars of dimensions 80 mm×10 mm×4 mm. A mixture of 50 vol.% toluene and 50 vol. % isooctane is used as the test medium. The test specimens were pre-stressed by means of a circular arc template (edge fiber elongation is 2.4%) and stored in the test medium at 23° C. The time to fracture under these conditions is determined.

The Vicat B/120 softening temperature is determined in accordance with ISO 306 on test bars of dimensions 80 mm×10 mm×4 mm.

The melt viscosity is determined at 260° C. under a shear rate of 1,000 s$^{-1}$ in accordance with DIN 54811.

The emission of volatile organic compounds (VOC) is determined in accordance with the automobile standard VDA 277 (PV 3341 of the VW specification) as μg carbon equivalent/g material. The measurement was carried out on test specimens produced at a melt temperature of 260° C.

A summary of the properties of the molding compositions is presented in Table 1.

The results of the experiments show that the PC/ABS composition according to Comparison Example 1, which contains as component C exclusively SAN having an acrylonitrile content of 28 wt. % (component C1), indeed has good ESC properties, but has an unsatisfactory ductility in the multiaxial penetration test at low temperatures.

A corresponding result is also achieved in Comparison Example 2, which contains too low a content of SAN having an acrylonitrile content of 23 wt. % (component C2).

The PC/ABS composition according to Comparison Example 3, which contains as component C exclusively SAN having an acrylonitrile content of 23 wt. % (component C2), has a satisfactory ductility in the multiaxial penetration test at low temperatures, but poor ESC properties.

The PC/ABS compositions according to the invention according to Examples 4 to 6, which contain as component C both SAN types C1 and C2 and wherein the SAN having an acrylonitrile content of 23 wt. % (component C2) is present in a content of 15 to 30 wt. %, based on the sum of the parts by weight of components C1 and C2, show a combination of good low temperature ductility in the multiaxial penetration test and good ESC properties, while retaining a good melt flowability, good processing stability and good heat distortion temperature. Furthermore, the composition according to Example 6 is distinguished by a very low emission of volatile organic compounds (measurement in accordance with the method of VDA 277).

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A thermoplastic molding composition comprising
   A) 30 to 80 parts by weight (pbw) of aromatic polycarbonate and/or polyester-carbonate
   B) 5 to 60 pbw of graft polymer and
   C) 10 to 60 pbw of mixture
      C.1) 40 to 92 wt %, based on component C), of a first rubber-free copolymer prepared by the solution, bulk or suspension polymerization process from
         C.1.1) 65 to 75 wt %. based on component C.1), of at least one monomer selected from the group consisting of vinylaromatics and vinylaromatics substituted on the nucleus and
         C.1.2) 25 to 35 wt %, based on component C.1), of at least one monomer selected from the group consisting of vinyl cyanides, (meth)acrylic acid ($C_1$-$C_8$)-alkyl esters, unsaturated carboxylic acids
      and
      C.2) 8 to 60 wt %, based on component C), of a second rubber-free copolymer prepared by the solution, bulk or suspension polymerization process from
         C.2.1) 75.1 to 85 wt %, based on component C.2), of at least one monomer selected from the group consisting of vinylaromatics substituted on the nucleus and
         C.2.2) 15 to 24.9 wt %, based on component C.2), of at least one monomer selected from the group consisting of vinyl cyanides, (meth)acrylic acid ($C_1$-$C_8$)-alkyl esters, unsaturated carboxylic acids and derivatives of unsaturated carboxylic acids.

TABLE 1

Molding compositions and their properties

|  |  | 1 (comparison) | 2 (comparison) | 3 (comparison) | 4 | 5 | 6 |
|---|---|---|---|---|---|---|---|
| Components [parts by wt.] | | | | | | | |
| A |  | 42.6 | 42.6 | 42.6 | 42.6 | 42.6 | 57.5 |
| B |  | 23.8 | 23.8 | 23.8 | 23.8 | 23.8 | 17.8*) |
| C1 |  | 32.7 | 30.7 | — | 27.8 | 22.8 | 17.8*) |
| C2 |  | — | 2.0 | 32.7 | 5.0 | 9.9 | 6.0 |
| D1 |  | 0.75 | 0.75 | 0.75 | 0.75 | 0.75 | 0.75 |
| D2 |  | 0.15 | 0.15 | 0.15 | 0.15 | 0.15 | 0.15 |
| Calculated ratio of C2/(C1 + C2) * 100% |  | 0 | 6% | 100% | 15% | 30% | 25% |
| Properties | | | | | | | |
| Splintering material failure in the penetration test (−30° C.) |  | yes | yes | no | no | no | no |
| Energy uptake in the penetration test (−30° C.) | [J] | 38 | 38 | 42 | 43 | 42 | 48 |
| Notched impact strength $a_K$ (300° C./−30° C.) | [kJ/m$^2$] | 13 | 19 | 19 | 17 | 18 | n.d. |
| ESC (time to fracture) | [min] | 34 | 32 | 4 | 38 | 25 | n.d. |
| Vicat B/120 | [° C.] | 112 | 112 | 111 | 112 | 112 | 121 |
| Melt viscosity | [Pas] | 195 | 197 | 196 | 192 | 195 | 222 |
| Emission according to VDA 277 | [μg C/g] | >30#) | >30#) | >30#) | >30#) | >30#) | 11 |

*)B and C1 are employed as a precompound
)Emission requirement according to VDA 277 was not more than 30 μg C/g. Values greater than 30 μg C/g are therefore not stated explicitly
n.d.: not determined 2. The composition according to claim 1, wherein the content of monomers C.1.2) in copolymer C.1) differs from the content of monomers C.2.2) in copolymer C.2) by 2 to 10 wt %.

3. The composition according to claim 1, wherein the content of component C.1.2) in copolymer C.1) differs from the content of component C.2.2) in copolymer C.2) differ from one another by 2.5 to 7 wt %.

4. The composition according to claim 1, wherein B is a graft polymer of
B.1) 5 to 95 wt %, based on B), of a mixture of
  B.1.1) 65 to 85 wt %, based on B.1, of at least one monomer selected from the group consisting of vinylaromatics, vinylaromatics substituted on the nucleus and methacrylic acid ($C_1$-$C_8$)-alkyl esters and
  B.1.2) 15 to 35 wt %, based on B.1, of at least one monomer selected from the group consisting of vinyl cyanides, (meth)acrylic acid ($C_1$-$C_8$)-alkyl esters and derivatives of unsaturated carboxylic acids
on
B.2) 95 to 5 wt % of at least one graft base having a glass transition temperature of <0° C., the graft base of B.2 having a median particle size ($d_{50}$ value) of from 0.05 to 10 µm.

5. The composition according to claim 4, wherein said graft base is a diene rubber.

6. The composition according to claim 4, wherein B.1.1), C1.1) and C.2.1) are styrene and where B.1.2), C.1.2) and C.2.2) are acrylonitrile.

7. The composition according to claim 6 comprising at least one additive selected from the group consisting of flameproofing agent, antidripping agent, lubricant, mold release agent, nucleating agent, antistatic, stabilizer, filler, reinforcing substance, dyestuff and pigment.

8. A thermoplastic molding composition comprising
A) 40 to 75 pbw or aromatic polycarbonate and/or polyester carbonate,
B) 10 to 45 pbw of a graft polymer of
  B.1) 5 to 95 wt %, based on B), of a mixture of
    B.1.1) 65 to 85wt %, based on B.1, of styrene and
    B.1.2) 15 to 35 wt %, based on B.1, of acrylonitrile
  on
  B.2) 95 to 5 wt % of crosliniked polybutadiene rubber, wherein the graft base has a median particle size of ($d_{50}$ value) of from 0.2 to 1 µm,
C) 15 to 40 pbw of a mixture of
  C.1) 65 to 90 wt %, based on component C). of a first rubber-free copolymer prepared by the solution, bulk or suspension polymerization process from
    C.1.1) 60 to 75wt %, based on component C.1.), of a styrene and
    C.1.2) 25 to 35 wt %, based on component C.1), of acrylonitrile
  and
  C.2) 10 to 35 wt %, based on component C), of a second rubber-free copolymer prepared by the solution, bulk or suspension polymerization process from
    C.2.1) 75.1 to 85 wt %, based on component C.2), of styrene and
    C.2.2) 15 to 24.9 wt %, based on component C.2), of acrylonitrile.

9. The composition according to claim 1, wherein at least some of the graft polymer B) and at least some of either C.1 or C.2 are present in the form of a precompound, said precompound prepared under vacuum devolatilization.

10. A process for the preparation of the thermoplastic molding composition of claim 1 comprising
a) compounding at least some of component B with at least some of component C under vacuum devolatilization to produce a precompound, and
b) mixing the precompound with component A to form a mixture and
c) melt compounding the mixture at 200° C. to 300° C.

11. A process for the preparation of the thermoplastic molding composition of claim 1 comprising
a) compounding at least some of component B with at least some of copolymer C.1 or C.2 in the presence of water under vacuum devolatilization to produce a precompound, and
b) mixing the precompound with a component from A to form a mixture and
c) melt compounding the mixture at 200° C. to 300° C.

12. The process according to claim 10 further comprising applying vacuum during said melt compounding step C.

13. The process according to claim 11 further comprising applying vacuum during said melt compounding step C.

14. A molded article comprising the composition of claim 1.

* * * * *